Nov. 4, 1969      P. D. CLARK      3,476,464
REMOTE CONTROL MIRROR SYSTEM
Filed March 23, 1967      4 Sheets-Sheet 1
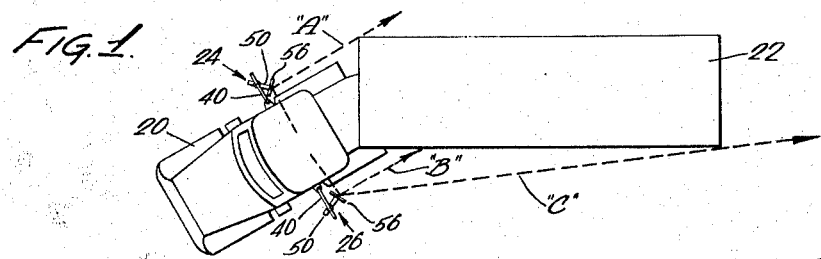
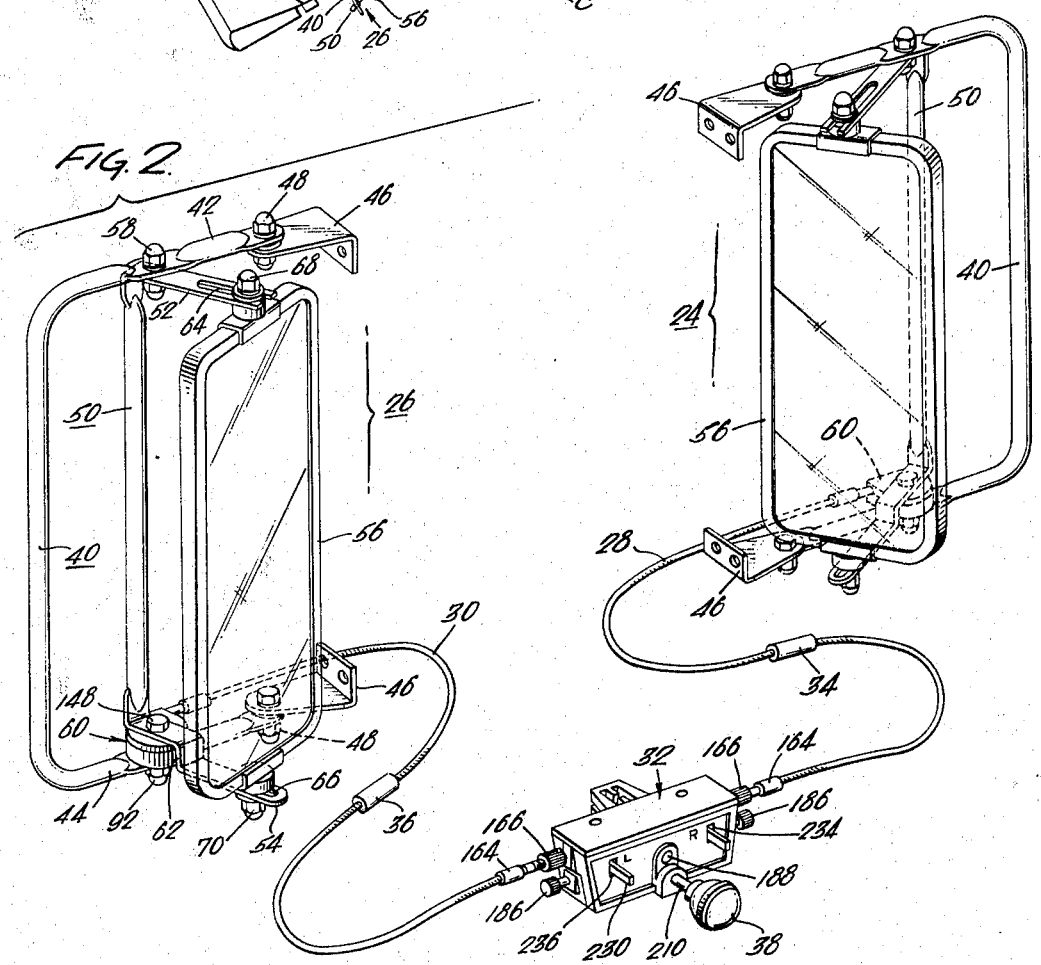
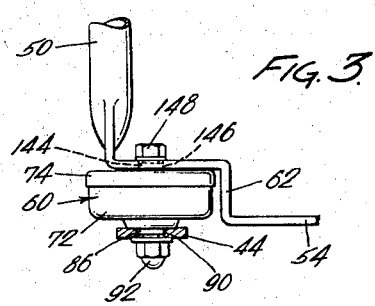
Inventor:
Paul D. Clark
by Howson & Howson
Attys.

Nov. 4, 1969      P. D. CLARK      3,476,464
REMOTE CONTROL MIRROR SYSTEM
Filed March 23, 1967      4 Sheets-Sheet 2
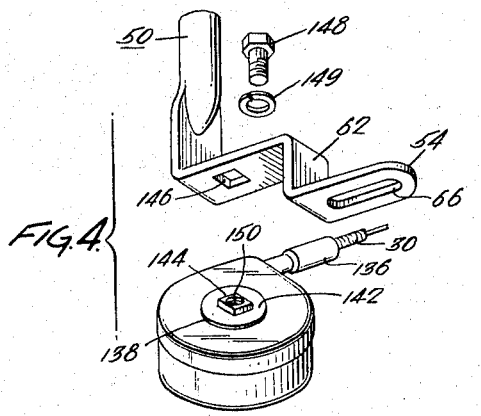
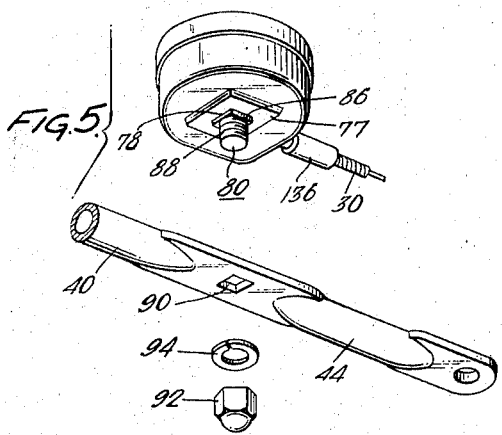
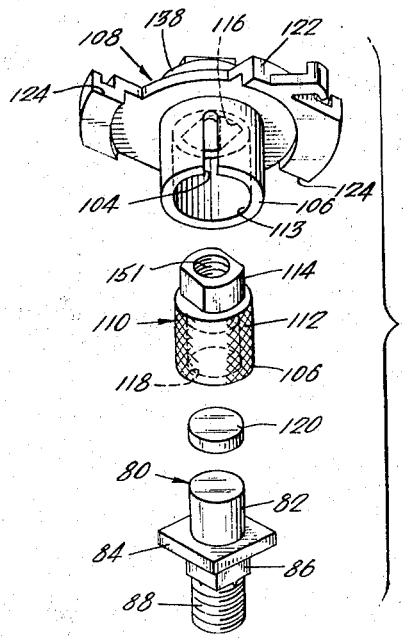
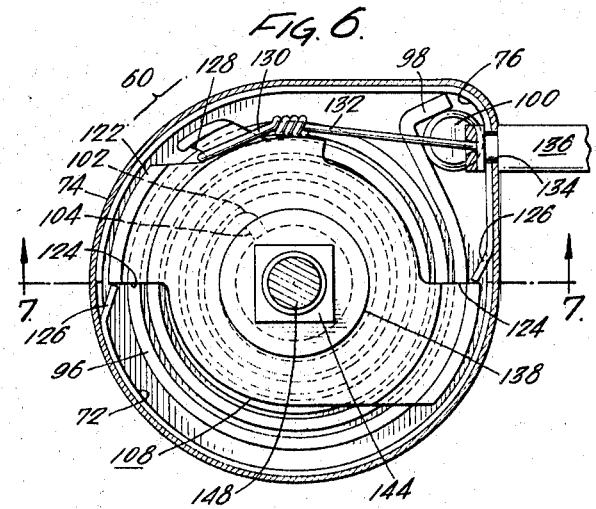
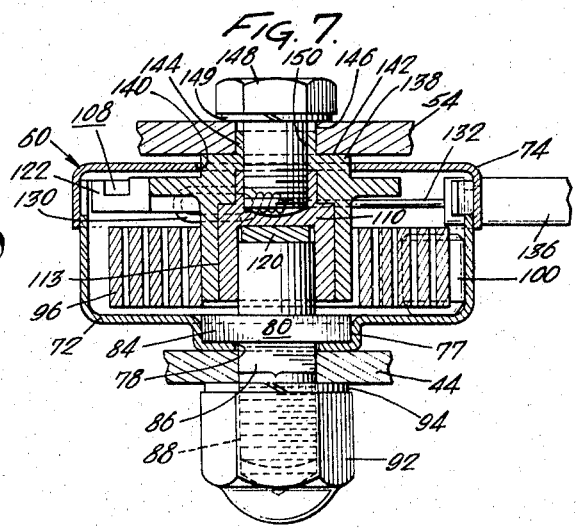
Inventor:
Paul D. Clark
by Howson & Howson
Attys

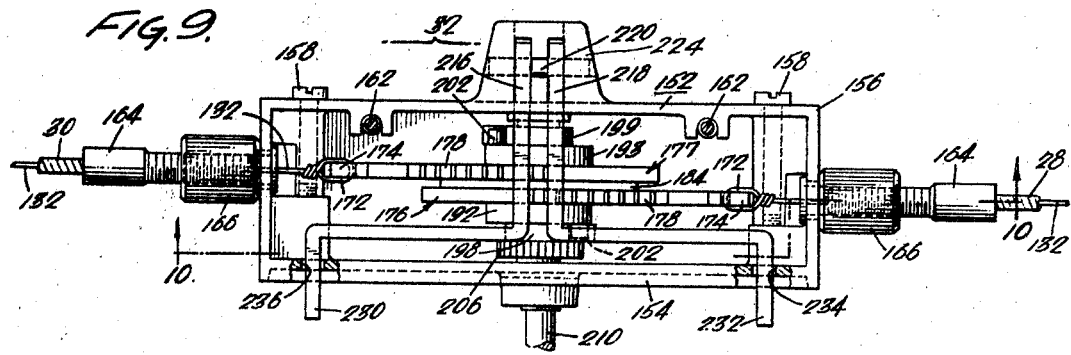
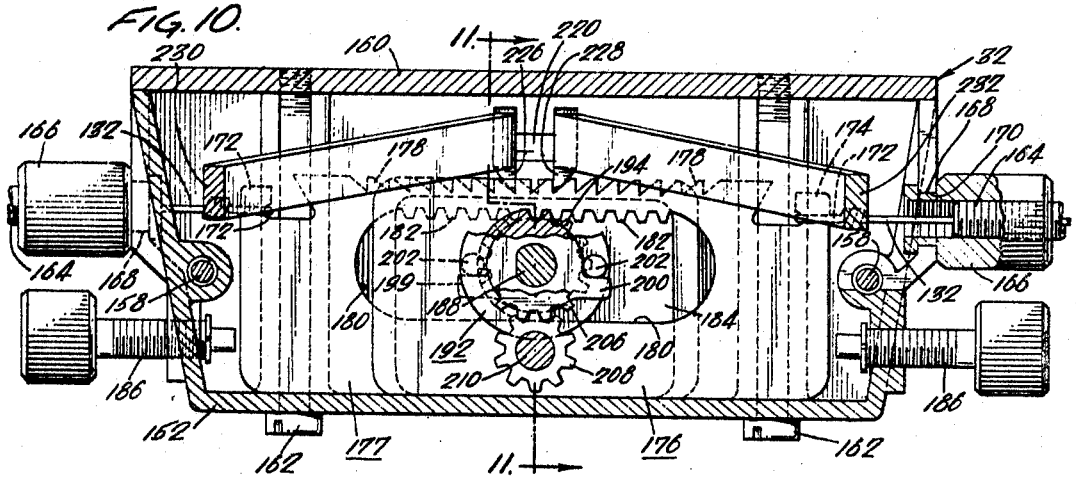
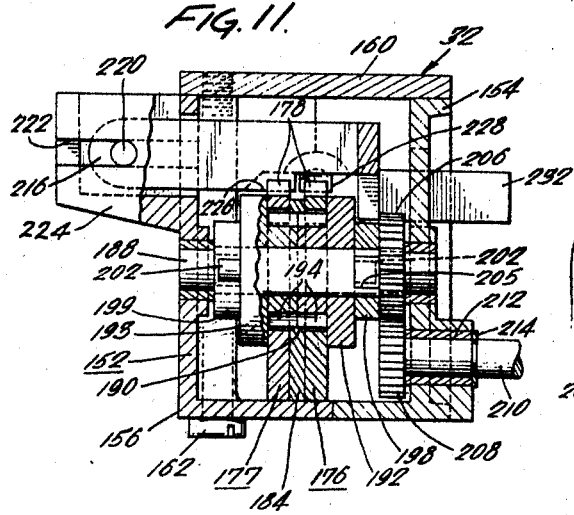
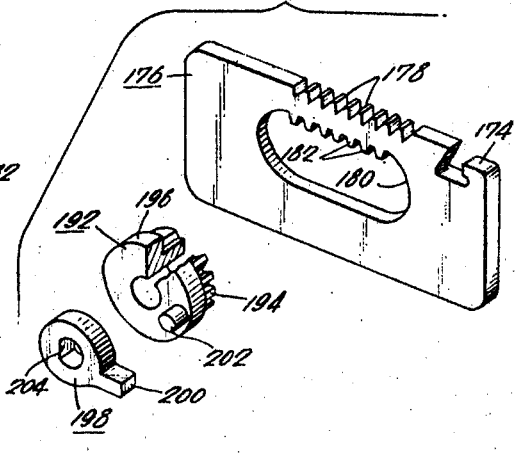

Nov. 4, 1969 P. D. CLARK 3,476,464
REMOTE CONTROL MIRROR SYSTEM
Filed March 23, 1967 4 Sheets-Sheet 4
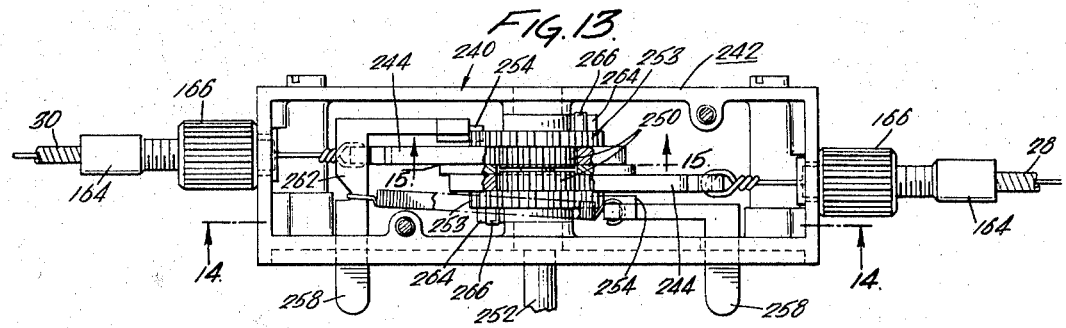
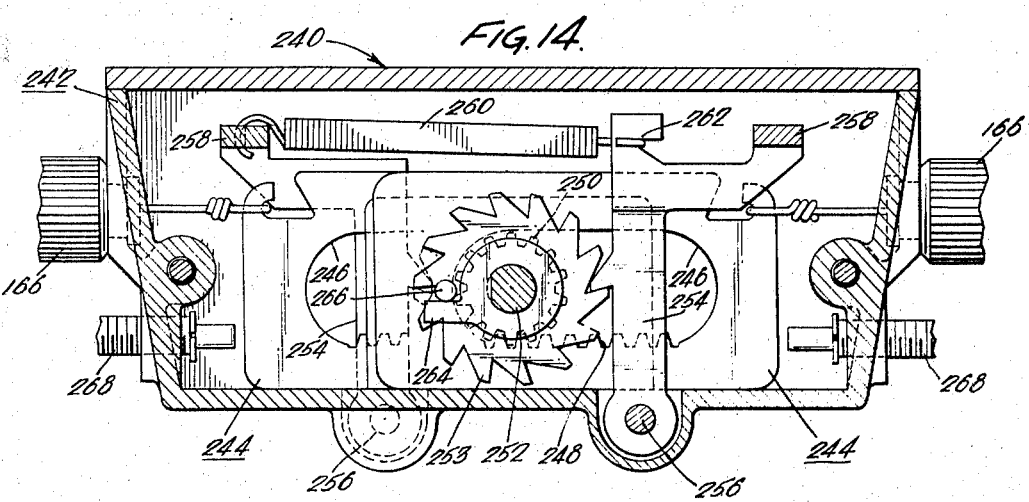
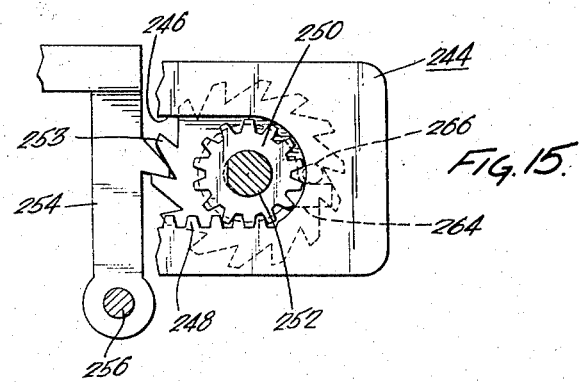
Inventor:
Paul D. Clark
by Howson & Howson
Attys United States Patent Office 3,476,464
Patented Nov. 4, 1969

3,476,464
REMOTE CONTROL MIRROR SYSTEM
Paul D. Clark, Willow Grove, Pa., assignor to Delbar Products, Incorporated, Perkasie, Pa., a corporation of Pennsylvania
Filed Mar. 23, 1967, Ser. No. 625,505
Int. Cl. G02b 7/18
U.S. Cl. 350—299    7 Claims

ABSTRACT OF THE DISCLOSURE

A remote control mirror system for trucks or similar vehicles which permits the remote adjustment of both the right and left hand rear view mirrors by means of a single control. The invention includes a novel control assembly mounted within the vehicle cab and connected by wire cables to the mirrors. The control assembly comprises a dual rack and pinion arrangement actuated by rotating a single control knob in opposite directions, and includes ratchets to permit independent release and spring driven return of each mirror to the normal position.

The present invention relates generally to remotely controlled rear view mirrors for trucks and similar heavy duty vehicles and relates more particularly to a remote control mirror system wherein both a right and left hand mirror may be adjusted by means of a single control knob in the vehicle cab.

In trucks and other vehicles in which the driver's view to the rear is obstructed by the width of the truck or trailer body extending well beyond the sides of the cab, the conventional rear view mirrors extending out from the cab beyond the truck or trailer body provide an adequate view to the rear when the truck is in normal operation on a highway. However, at other times during both backward and forward vehicle operation, the mirrors in their normally adjusted position fail to provide the necessary rearward view for safe vehicle operation.

For example, when a truck is merging with turnpike traffic from an access ramp, the view the driver obtains from the left hand mirror is one of the ramp behind the truck rather than of traffic approaching on the turnpike. With a conventional mirror, the driver must make essentially a blind entry from the access ramp, trusting that other vehicles will provide sufficient room.

Another instance in which the conventional truck mirror provides an inadequate rearward view is during the backing of tractor trailer trucks. When the tractor is disposed at an angle to the trailer, neither mirror will show the rear of the trailer without readjustment.

To provide the proper field of rear view under these and other circumstances and to permit a substantially safer vehicle operation, the present invention provides a novel dual mirror control system whereby the field of view of both the right and left hand mirrors may selectively be outwardly adjusted from a normal mirror position by means of a single control knob in the cab of the vehicle. Rotation of the control knob to the right provides an outward rotation of the right hand mirror about a vertical axis while left hand rotation of the knob provides the same effect with the left hand mirror. The mirrors are held in the outwardly adjusted positions by ratchets until released therefrom by separate release levers adjacent the control knob, the mirrors being spring loaded to return on release to their normal positions.

It is accordingly a first object of the present invention to provide a remote control mirror system for a truck or similar vehicle wherein the right and left hand rear view mirrors of the vehicle may be remotely selectively outwardly rotated from their normal position by operation of a single control in the vehicle cab.

A further object of the invention is to provide a mirror system as described wherein each mirror is held automatically in the outwardly adjusted position until release of a lever on the cab control assembly which allows an immediate spring driven return of the mirror to the normal driving position.

Another object of the invention is to provide a mirror system as described wherein only a single wire cable is required to connect the cab control to each mirror assembly.

Still another object of the invention is to provide a mirror system as described wherein the mirror heads are offset from their vertical axes of rotation to permit adjustment of the vertical tilt angle of the mirrors.

A still further object of the invention is to provide a mirror system as described wherein the normal driving position of the mirrors may be adjusted remotely at the mirror control assembly within the vehicle cab.

Another object of the invention is to provide a mirror system of the type described of a strong, foolproof mechanical construction which will withstand the severe vibrations and rough treatment to which truck accessories and particularly mirrors are normally subjected.

Additional objects and advantages of the invention will be more readily apparent from the following detailed description of embodiments thereof when taken together with the accompanying drawings in which:

FIG. 1 is a schematic plan view showing a tractor trailer equipped with a mirror system embodying the present invention;

FIG. 2 is a perspective view of the unmounted mirror system showing the right and left hand mirror assemblies and the mirror control assembly operatively connected thereto;

FIG. 3 is an enlarged partial elevational view showing the manner in which the mirror spring drive unit is mounted between the arms of the mirror brackets;

FIGS. 4 and 5 are exploded perspective views showing in further detail the manner in which the spring drive unit is connected to the mirror bracket arms;

FIG. 6 is an enlarged sectional view taken through one of the spring drive units;

FIG. 7 is a sectional view taken along line 7—7 of FIG. 6;

FIG. 8 is an exploded perspective view showing the various elements making up the rotating assembly within the spring drive unit;

FIG. 9 is a plan view of the control assembly shown with the mounting plate removed;

FIG. 10 is a sectional view taken along line 10—10 of FIG. 9;

FIG. 11 is a sectional view taken along line 11—11 of FIG. 10;

FIG. 12 is a perspective exploded view showing one set of the rack, pinion and drive pawl elements of the control assembly;

FIG. 13 is a plan view of a modified form of control assembly shown with the mounting plate removed and with parts broken away to show construction details;

FIG. 14 is a sectional view taken along line 14—14 of FIG. 13; and

FIG. 15 is a fragmentary elevational view showing the manner in which one of the ratchet arms cooperates with the ratchet teeth of a pinion of the control assembly of FIGS. 13 and 14.

Referring to the drawings and particularly FIG. 1 thereof, a tractor 20 and trailer 22 are shown in an angled relation during backing of the vehicle. It is apparent that the right and left hand mirror assemblies 24 and 26 in their normal driving position would be of little help in guiding the trailer since their normal reflected views A and B do not show the rear of the trailer. The right hand mirror in the situation illustrated cannot of course be adjusted to provide a view of the rear of the trailer but the left hand mirror can be outwardly adjusted to provide the line of sight C providing a view of the left rear corner of the trailer. As the backing continues, the angle between the tractor and trailer will constantly change and the mirror angle must be readjusted to provide a continuing view to the rear of the trailer. As described in detail below, the present invention provides a mirror system in which both the right and left hand mirror may be remotely adjusted by a single control in the cab and may be instantly returned to their normal positions.

In FIG. 2, the unmounted right and left hand mirror assemblies 24 and 26 are shown respectively connected by means of control cables 28 and 30 to the mirror control assembly 32 which is adapted for mounting under the dashboard of the vehicle within convenient reach of the driver. The control cables 28 and 30 are single wire cables of the type commonly known as Bowden wire and may include cable splices 34 and 36 for convenience in installing the remote control system. The control assembly, which will be described in detail below, includes a control knob 38 which, when rotated in a clockwise direction, actuates the right hand mirror and when rotated in a counterclockwise direction actuates the left hand mirror.

The mirror assemblies 24 and 26 are identical in construction and the respective elements thereof will thus be given the same identifying numbers. Each mirror assembly includes a U-shaped guard bracket 40 having upper and lower parallel arms 42 and 44 to the ends of which are attached the angles 46 adapted for attachment to the vehicle cab. The guard bracket 40 is adjustably connected to the angles 46 by the bolts 48 which may be tightened upon installation of the assembly to secure the bracket at the desired angle. As shown in FIG. 1, the bracket 40 normally extends at right angles to the vehicle cab.

A substantially U-shaped mirror bracket 50 includes upper and lower parallel arms 52 and 54 adapted to support a mirror head 56 between their outer ends. The bracket 50 is pivotally mounted between the arms 42 and 44 of the bracket 40 for remotely controlled rotation about a vertical axis. The bracket 50 is pivoted at its upper end about the bolt 58 passing through the arms 42 and 52. At its lower end, the bracket 50 is pivotally attached to the spring drive unit 60 which is mounted between the arm 44 of bracket 40 and the arm 54 of bracket 50. The arm 54 is stepped at 62 toward the inner end thereof to receive the spring drive unit. The upper and lower arms 52 and 54 of the bracket 50 are slotted at their outer ends respectively at 64 and 66 to receive the mirror head mounting studs and to permit adjustment of the vertical tilt of the mirror head by means of the upper and lower mirror adjusting nuts 68 and 70 on the studs.

The spring drive unit 60 as shown most clearly in FIGS. 4–8 includes a housing 72 having an overlying cap 74. The housing and cap are of a generally cylindrical shape for three quarters of their circumference, the remaining quarter comprising straight walled portions tangential with the cylindrical wall portions and forming a corner 76 for a purpose described below.

The bottom of the housing includes a central depressed region 77 of a square shape and having a central square bore 78. The square depressed portion and square bore are adapted to receive the bearing stud 80 shown most clearly in FIG. 8, the stud having a smooth cylindrical upper portion 82, a flat square portion 84 adapted to seat within the square depression 77 of the housing, a smaller square shank portion 86 beneath the portion 84, and a threaded lower end portion 88. As shown in FIGS. 5 and 7, the square shank portion 86 is adapted to fit within the square bore 78 of the housing and into the square hole 90 in the arm 44 of bracket 40. A nut 92 and lock washer 94 are tightened over the threaded portion 88 of the bearing stud to lock the housing 72 securely to the arm 44 to prevent rotation of the housing and the stud with respect to the arm. The arms 42 and 44, illustrated as fabricated of tubular material, are preferably flattened at their points of attachment to the angles 46 and at the pivot points for the bracket 50.

A flat torsion spring 96 is disposed within the housing 72 with the outer end 98 thereof engaging the spring retaining pin 100 in the corner 76 of the housing. The pin 100 is not attached to the housing but remains captive due to the shape of the housing and the torsion force of the spring. The inner end 102 of the spring is turned radially inwardly and engages a slot 104 in the downwardly extending cylindrical portion 106 of the pulley 108 The pulley 108 is mounted for rotation on the cylindrical portion 82 of bearing stud 80 and includes a bushing 110 having a knurled cylindrical surface 112 adapted for a press fit within the bore 113 of the cylindrical portion 106. A shank portion 114 of the bushing having flat side walls is adapted to fit within a complementary socket 116 in the pulley to prevent rotation of the bushing with respect to the pulley. The bushing includes an interior bore 118 adapted to fit over the cylindrical portion 82 of the bearing stud 80 and is provided with a flat bearing 120 to reduce friction due to axial forces.

The rim 122 of the pulley is cut away in an irregular manner to form shoulders 124 adapted to engage the inwardly formed stop elements 126 of the housing and thus limit the unwinding of the spring. The rim 122 also includes a hook portion 128 around which the looped end 130 of the wire 132 of the control cable is attached. As shown most clearly in FIG. 6, the cable passes through a hole 134 near the corner 76 of the housing and is provided with a suitable fitting 136 to connect the cable sheath to the housing. On actuation of the control knob 38 of the control assembly 32 in the appropriate direction, the wire 132 will be advanced against the force of the torsion spring 96 to rotate the pulley 108.

The upper end of the pulley includes a cylindrical shank portion 138 which extends through a bore 140 in the cap 74 and terminates in an annular bearing surface 142 on which the arm 54 of bracket 50 is seated. A square neck portion 144 of the pulley extends upwardly into a square hole 146 in the arm 54. A bolt 148 provided with lock washer 149 is inserted through the hole 146 through a bore 150 in the pulley, and is threadedly engaged with a threaded bore 151 of the bushing 110 to secure the arm 54 to the pulley. The square neck 144 of the pulley engaged with the square hole 146 of the arm locks the arm to the pulley for rotation therewith upon actuation of the pulley by means of the control knob 38.

The spring drive unit 60 functions to continually urge the mirror support bracket 50 toward the normal driving position. As will be described below, the normal driving position may be adjusted from within the cab by an adjustment on the control assembly 32. The stop elements 126 are thus not essential but are a convenience for assembly of the spring drive unit.

The control assembly 32 as shown in detail in FIGS. 9–12, includes a split housing 152 formed of front and rear housing sections 154 and 156 held together by screws 158. The top of the housing is covered by a mounting plate 160 adapted to be secured beneath the dashboard of the vehicle with the housing being subsequently attached thereto by means of bolts 162.

The control cables 28 and 30 are led through opposite ends of the housing 152 as shown in FIGS. 9 and 10. Terminals 164 on the ends of the cable sheaths are threadedly engaged within the cable nuts 166 which are rotatably secured within bores 168 in the housing ends by means of a groove 170 in the nuts, the housing being split through the bores 168 to permit the insertion of the cable nuts. The looped ends 172 of the cable wires are placed over the hook portions 174 of rack elements 176 and 177, one of which is shown in detail in the perspective view of FIG. 12. Each rack element is an upright rectangular thin metal plate having the hook portion at one upper corner thereof and having ratchet teeth 178 along the top edge. A central longitudinally extending slot 180 in each rack element includes rack teeth 182 along the upper edge thereof. As shown most clearly in FIG. 9, the rack elements 176, 177 are positioned in parallel relation within the housing 152 separated by a spacer 184. The rack elements rest on the floor of the housing and are moved longitudinally within the housing for adjustment of the mirrors by a pinion arrangement to be described below.

In view of the force of the spring drive units on the cables 28 and 30, the rack elements will be urged by the spring drive units toward the ends of the housing. The travel of the rack elements toward the housing end walls is limited by the adjusting screws 186 threaded through the housing end walls. Adjustment of the adjusting screws 186 will thus determine the return limit of the cables 28 and 30 and hence the return position of the mirrors. The adjusting screws 186 thus are the primary mirror return limits, the stop elements 126 being provided only as a convenience for assembling the spring drive units.

To provide selective longitudinal motion of the rack elements 176 and 177 against the forces of the spring drive units, a shaft 188 is journaled transversely between the front and back walls of the housing, passing through the slots 180 of the rack elements and through a suitable bore 190 in the spacer 184. Mounted on the shaft 188 for free rotation thereon are opposed pinions 192 and 193 which, as shown in FIG. 12, include a pinion gear tooth portion 194 and an adjacent flange portion 196 of greater diameter, the pinion gear teeth 194 being adapted to cooperate with the rack teeth 182 of the rack elements. The width of the slots 180 in the rack elements is such that the teeth 194 and 182 are in continual engagement. The flange portion 196 of the pinions prevents the pinion teeth from moving inwardly out of engagement with the rack teeth. As shown in FIG. 11, the pinions 192 and 193 are in opposed abutting relation on the shaft 188 for respective engagement with the rack teeth of rack elements 176 and 177, the pinion gear portions 194 extending into the bore 190 in the spacer 184.

Attached to the shaft 188 adjacent the outer face of the pinions 192 and 193 are the drive pawls 198 and 199, each of which include pawl arms 200 adapted to engage the pins 202 extending from the outer faces of the pinions 192 and 193. The drive pawls are prevented from rotating on the shaft by flats 204 in the bores thereof which cooperate with flats 205 on the shaft. As shown in FIGS. 9 and 10, the drive pawls 198 and 199 are positioned on the shaft with their pawl arms extending at approximately 180° for reasons which will be apparent from the description below.

A spur gear 206 secured to the forward end of shaft 188 meshes with a similar gear 208 on the inner end of the control shaft 210 which passes through the forward end of the housing and is journaled in bearing 212 therein. A spring washer 214 is provided in a groove in the shaft to prevent inward movement thereof. As shown in FIG. 2, the control knob 38 is attached to the outer end of the control shaft 210 to permit convenient manual rotation of the shafts 210 and 188.

On rotation of the control knob 38 in a clockwise direction, the shaft 188 will be rotated in a counterclockwise direction and the drive pawl 198 will engage the pin 202 of pinion 192 to rotate the pinion in a counterclockwise direction and hence move the rack element 176 to the left, thus drawing the cable 28 against the force of the spring drive unit and rotating the right hand mirror outwardly. Similarly, rotation of the control knob 38 in a counterclockwise direction will move the drive pawl 199 in a clockwise direction to rotate the pinion 193 in a clockwise direction and hence move the rack element 177 to the right thereby pulling the control cable 30 against the spring drive unit and rotating the left hand mirror outwardly.

To hold the mirrors in the desired outwardly adjusted positions, separate ratchet means are provided for each rack element. A pair of ratchet arms 216 and 218 are pivotally mounted about the pin 220 extending through holes in the rear ends of the ratchet arms and the slots 222 in the auxiliary housing 224 extending from the rear of the housing 152. The arms 216 and 218 include respective ratchet tooth elements 226 and 228 which, as shown in FIG. 11, are positioned to respectively engage the ratchet teeth 178 of the rack elements 176 and 177. The arms 216 and 218 extend forwardly in a Z-shape and terminate in release arms 230 and 232 which extend respectively through vertical slots 234 and 236 in the front wall of the housing 152. The weight of the ratchet arms is sufficient to automatically lock the rack elements and hence the mirrors in any outwardly adjusted position to which they are adjusted by means of the control knob 38. Release of the ratchets requires little effort despite the spring force pulling on the rack elements in view of the substantial leverage afforded by the outwardly extending release arms 230 and 232.

For operation of the system, the mirror assemblies are mounted at opposite sides of the cab of the vehicle in the manner illustrated in FIG. 1 with the guard brackets 40 extending at substantially right angles to the sides of the vehicle. The mirror vertical tilt angle and horizontal angle are then adjusted by means of the nuts 68 and 70 to approximate as closely as possible the desired normal driving position. The control unit 32 is attached at a convenient location in the vehicle cab and the cables 28 and 30 are connected to the spring drive units 60. The final desired normal driving position of the mirrors is then accurately set by means of adjusting screws 186 on the control assembly. In the event that insufficient adjustment is obtainable from the adjusting screws 186, the nuts 68 and 70 must then be loosened and the mirror again approximately adjusted from outside the vehicle. Once these few initial settings have been made, the system should require no further adjustment.

During operation of the vehicle, for example in the backing situation illustrated in FIG. 1, to rotate the left hand mirror outwardly to obtain the view of the rear of the trailer illustrated by sight line C, the control knob 38 is slowly rotated in a counterclockwise direction until the desired field of view is obtained. The ratchet arm 216 will automatically lock the rack element 177 at the outwardly adjusted mirror position and the backing of the vehicle may then continue until readjustment of the mirror is needed as the tractor angle changes with respect to the trailer. At this time, the knob may be further rotated and will automatically lock in a second outwardly adjusted position. This process may continue several times until the backing is completed, at which time the left hand release lever 230 is raised upwardly to permit the mirror to return to its normal position under the influence of the spring drive unit. If, during the backing operation, there should be a need to move the mirror angle inwardly to a position intermediate the normal position and that at which the mirror is set, the release lever is tripped and the mirror movement started from the normal position.

The right hand mirror is, of course, operated in exactly the same manner, the knob being rotated in a clockwise direction and the release lever 232 being employed to return the mirror to its original position. Both mirrors may be outwardly rotated during the same backing maneuver and either one may be selectively released to its original position at any time without affecting the other. The simplicity of the controls and particularly the feature of a single control knob allowing adjustment of both the left hand and right hand mirrors makes the device particularly well suited for modern trucks, the cabs of which are already complicated by a great number of knobs and levers.

Referring to FIGS. 13-15, a control assembly generally designated 240 is illustrated of a construction similar to that of assembly 32 but modified in particular with respect to the ratchet means and the control shaft. The control unit 240 includes a split housing 242, which, in a manner similar to that of the preferred embodiment, provides a mounting arrangement for the cable nuts 166 to lead the cable wires into the housing for attachment to the slidable rack elements 244. The rack elements 244 include central slots 246 therein which have the rack teeth 248 along the bottom edge thereof for engagement by pinions 250 as shown in FIG. 15.

The pinions, which are mounted for free rotation on a shaft 252, include integral therewith, in place of the flanges of the previous embodiment, large ratchet teeth 253 which are adapted for engagement by the ratchet arms 254 pivotally mounted at 256 in the bottom of the housing. The ratchet arms 254 include release levers 258 extending through transverse slots in the front of the housing. The release levers are moved horizontally toward the ends of the housing to release the ratchet arms from the pinions. Since gravity cannot be employed to engage the ratchet arms with the pinion ratchet teeth, a spring 260 extending between hook portions 262 on the ratchet arms serves to insure engagement of the ratchets. The rack elements 244 are thus held against the force of the spring drive units by preventing rotation of the pinions 250 rather than by directly restraining the rack elements by ratchet arms as in the preferred embodiment.

In the modified control assembly, the control knob (not shown) is attached directly to the shaft 252 on which the pinions are mounted for which reason the teeth 248 in the rack element slot 246 are on the bottom of the slot. Drive pawls 264 secured to the shaft cooperate with pins 266 extending from the pinions 250 in a manner similar to that of the preferred embodiment. Clockwise rotation of the control knob will thus produce a leftward movement of the rack element connected to the right hand control cable and thus actuate the right hand mirror. Conversely, the counterclockwise rotation of the control knob will move the rack element controlling the left hand cable to the right and thus actuate the left hand mirror. Operation of the modified control assembly may thus be understood to be exactly the same as that of the preferred embodiment with the minor exception of the release levers 258 which are moved transversely outwardly rather than vertically to release the respective mirrors. The normal driving position of the mirrors can be adjusted in exactly the same manner as that of the preferred embodiment by means of the partially shown adjusting screws 268.

From the above description it can be readily understood that the present invention carries out all of the objects enumerated above in providing a simple, effective and durable mechanical control permitting remote control of both left and right hand mirrors by means of a single control knob.

I claim:

1. A remote control mirror system for a truck or similar vehicle comprising right and left hand mirror assemblies adapted for attachment to the sides of the vehicle, said mirror assemblies each including a mirror head mounted for rotation about a substantially vertical axis, each said mirror head being offset from the vertical axis of rotation and including means permitting adjustment of the vertical tilt angle thereof without affecting rotation about a vertical axis, a spring drive unit in each mirror assembly adapted to control the rotation of the mirror head and including a spring rotationally urging the miror head inwardly toward a normal driving position, a mirror control assembly adapted for mounting within the vehicle within reach of the vehicle operator, said control assembly comprising a housing, a pair of parallel rack elements having rack teeth thereon slidably disposed in said housing, a shaft journaled in said housing having a pair of pinions freely rotatable thereon, each pinion operatively engaging the rack teeth of one of said rack elements, a drive pawl fixedly mounted on said shaft adjacent each said pinion, a pin extending from each pinion adapted for engagement by the adjacent drive pawl upon rotation of said shaft, a control knob on said control assembly coupled to said shaft for selective rotation thereof, a control cable operatively connecting each rack element with one of said mirror assembly spring drive units to provide outward rotation of said mirrors upon movement of said rack elements, said drive pawls and pinion pins being so arranged as to permit selective rotation of one said pinion by rotating said control knob in one direction, and rotation of the other of said pinions by rotation of the control knob in the other direction, rotation of said pinions slidably moving said rack elements to effect a selective outward rotation of said mirror heads, means for holding each said mirror head in an outwardly adjusted position, and means permitting selective release of each mirror head to the normal driving position.

2. The system as claimed in claim 1 wherein said means for holding each mirror head in an outwardly adjusted position and for permitting selective release of each mirror head to the normal driving position comprise ratchet teeth on each said rack element, and a pair of ratchet arms pivotally mounted in said housing, each said ratchet arm adapted to engage the ratchet teeth of one of said rack elements, and a release lever extending from each ratchet arm operable for independent release of each ratchet arm.

3. The system claimed in claim 1 including means in said control assembly for adjustably establishing the normal driving position of each said mirror head, said latter means comprising adjusting screws threadedly mounted in said housing aligned with said rack elements to limit the movement of each said rack element in one direction.

4. A control assembly for the control of a pair of remotely operable devices connected thereto by means of control cables, said control assembly comprising a housing, a pair of parallel rack elements having rack teeth thereon slidably disposed in said housing, each rack element connected to one of the control cables, a shaft journaled in said housing having a pair of pinions freely rotatable thereon, each pinion operatively engaging the rack teeth of one of said rack elements, a drive pawl fixedly mounted on said shaft adjacent each said pinion, a pin extending from each pinion adapted for engagement by the adjacent drive pawl upon rotation of said shaft, a control knob operative for selective rotation of said shaft, said drive pawls and pinion pins being so arranged as to permit selective rotation of one of said pinions by rotating said control knob in one direction, and rotation of the other said pinion by rotation of the control knob in the other direction, rotation of said control knob thereby effecting sliding movement of said rack elements to effect a selective remote control of said pair of devices through said control cables, and means for holding and selectively releasing each said rack element.

5. The control assembly as claimed in claim 4 wherein said means for holding and selectively releasing each said rack element comprises ratchet teeth on each said rack element, and a pair of ratchet arms pivotally mounted in said housing, each said ratchet arm adapted to engage the ratchet teeth of one of said rack elements, and a release lever extending from each ratchet arm operable for independent release of each ratchet arm.

6. A control assembly as claimed in claim 4 wherein said means for holding and selectively releasing each said rack element comprises ratchet teeth on each said pinion element, and a pair of ratchet arms pivotally mounted in said housing, each said ratchet arm adapted to engage the ratchet teeth of one of said pinions, and a release lever extending from each ratchet arm operable for independent release of each said rack elements.

7. A control assembly as claimed in claim 4 including means for adjustably establishing the normal position of the devices, said means comprising adjusting screws in said control assembly housing aligned with said rack elements and adjustable to limit the movement of each said rack element in one direction.

References Cited

UNITED STATES PATENTS

| 2,903,944 | 9/1959 | Cooper. |
| 3,238,800 | 3/1966 | McCord. |
| 3,390,588 | 7/1968 | Savage. |
| 3,390,937 | 7/1968 | Nicholson _____ 350—289 |

DAVID SCHONBERG, Primary Examiner

R. L. SHERMAN, Assistant Examiner

U.S. Cl. X.R.

74—501